Oct. 19, 1965 N. E. FRAWLEY 3,212,568

ELECTRONIC MODULE RECEPTACLE

Filed Feb. 20, 1963 2 Sheets-Sheet 1

INVENTOR.
NORMAN E. FRAWLEY

BY

Ernest L. Brown

ATTORNEY

Oct. 19, 1965 N. E. FRAWLEY 3,212,568

ELECTRONIC MODULE RECEPTACLE

Filed Feb. 20, 1963 2 Sheets-Sheet 2

INVENTOR.
NORMAN E. FRAWLEY

BY

Ernest L. Brown
ATTORNEY

United States Patent Office 3,212,568
Patented Oct. 19, 1965

3,212,568

ELECTRONIC MODULE RECEPTACLE

Norman E. Frawley, Downey, Calif., assignor to North American Aviation, Inc.

Filed Feb. 20, 1963, Ser. No. 259,916
11 Claims. (Cl. 165—69)

Figure 1:
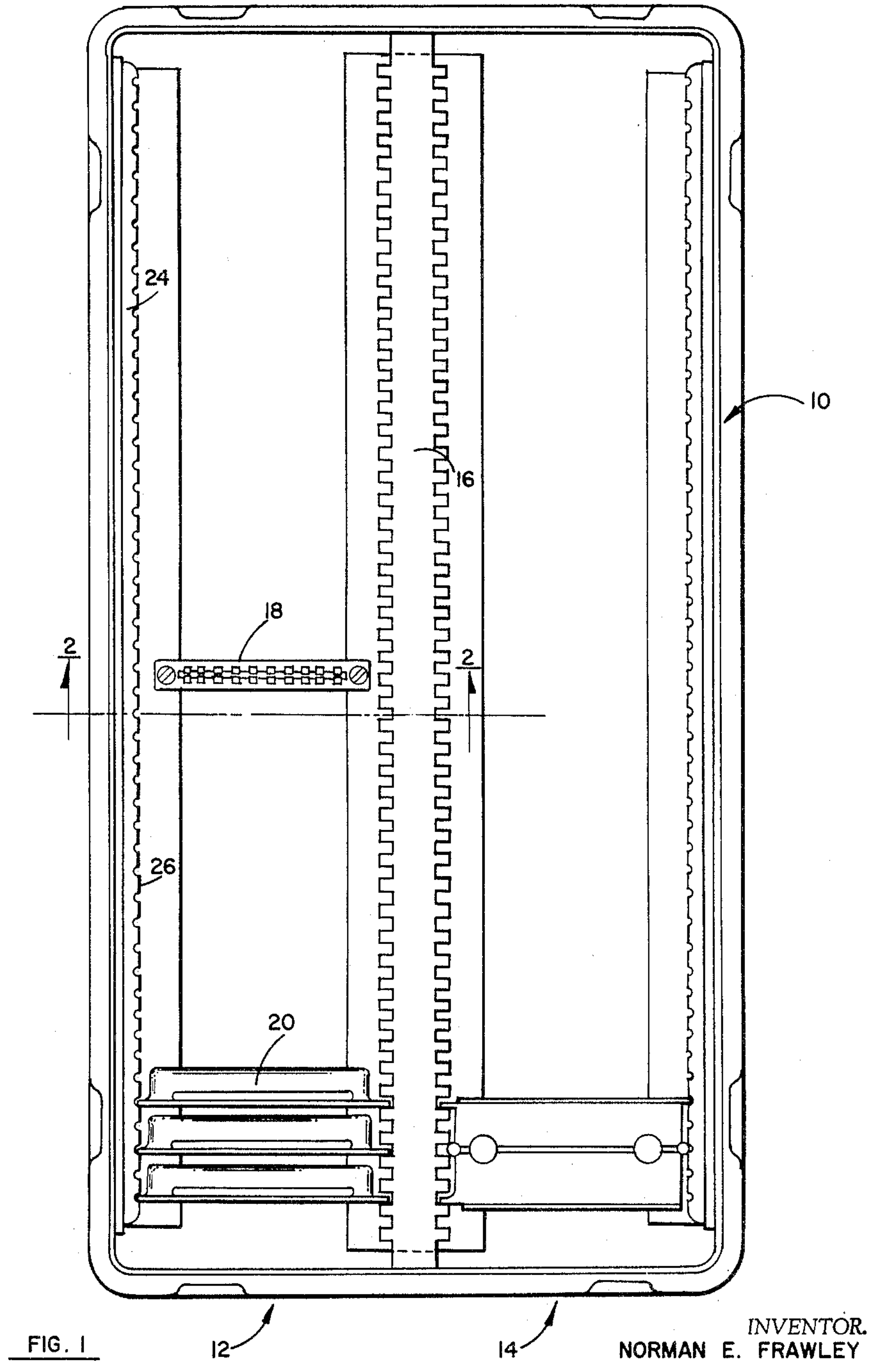

This invention pertains to an electronic module receptacle and more particularly to such a receptacle which is adapted to remove heat from electronic modules.

In the prior art electronic module receptacles are customarily made of sheet metal stampings. A conventional receptacle is designed to hold electronic modules of varying widths. The modules are supported by a grooved pad on one side of the package and a grooved heat dissipator in the center of the package. Cooling air is forced through the heat dissipator to cool the electronic modules.

In the prior art a rubber pad without a bearing plate is customarily used to force the modules into contact with the heat dissipator. The rubber pad carries grooves which support the electronic modules. The resiliency of the rubber pad presses the modules toward the heat dissipator. The modules, however, bind in the grooves. After a few insertions and withdrawals of the modules some of the rubber groove nibs come off so that the modules are skewed and do not efficiently engage the heat dissipator or the associated electrical connector.

The module receptacle of this device is adapted efficiently to force the electronic modules into thermal engagement with a heat dissipator. To that end, the device of this invention uses a bearing plate which is grooved to receive the electronic modules. The bearing plate is preferably slightly flexible to accommodate dimension variation in the modules. The bearing plate is then spring biased toward the heat dissipator to force electronic modules which are positioned in the receptacle into thermal contact with the heat dissipator. The means for spring biasing the bearing plate toward the electronic modules and toward the heat dissipator is a fibrous spring pad which is preferably fabricated of fiber glass mat and coated with a moisture proof material such as—for example—a plastic material.

It is therefore an object of this invention to remove heat efficiently from electronic modules.

It is another object of this invention to receive electronic modules for storage, to remove heat from the electronic modules, and to spring bias the electronic modules into thermal contact with a heat dissipator.

It is a more particular object of this invention to spring bias a plurality of electronic modules into thermal contact with a heat dissipator by applying a biasing force through a bearing plate and a spring.

It is still a more particular object of this invention to utilize a fibrous spring pad for a biasing spring to force electronic modules into thermal contact with a heat dissipator.

It is still a much more specific object of this invention to utilize fiber glass, coated with a moisture resistant material, as a spring pad for forcing electronic modules into contact with a heat dissipator.

It is a very specific object of this invention to provide means for achieving the above objects.

Figure 2:
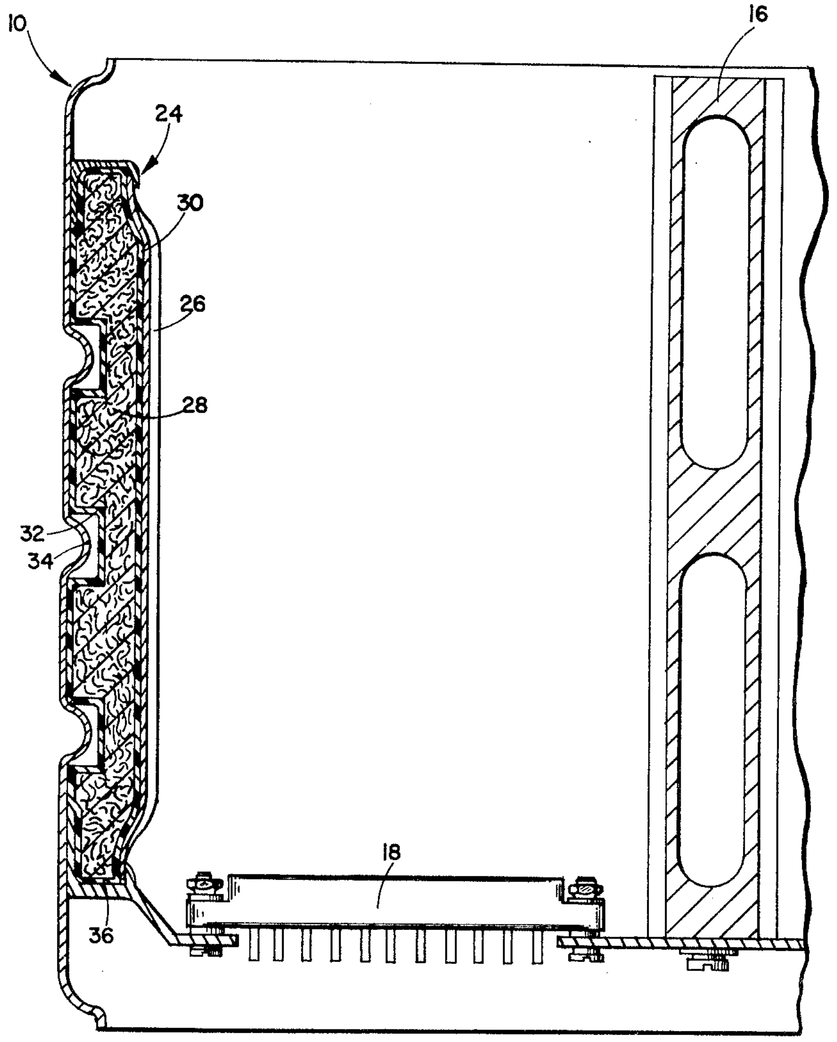

Other objects will become apparent from the following description taken in connection with the accompanying drawings in which:

FIG. 1 shows a typical electronic module receptacle adapted to remove heat from electronic modules and to spring bias the electronic modules into thermal contact with a heat dissipator in accordance with this invention; and FIG. 2 is a view, partially in section, taken at 2—2 in FIG. 1.

The usual electronic module receptacle 10 is adapted to receive two rows 12 and 14 of electronic modules of various sizes. Each row of the receptacle is adapted to contact a heat dissipator 16. In the bottom of the receptacle is a plurality of electrical plugs, only one of which is shown at 18 in FIGS. 1 and 2. Each of the electronic modules—for example module 20—has at least one flange thereon adapted to be inserted in a plurality of thermally conducting grooves (one of which is shown at 22 of FIG. 1) in heat dissipator 16.

A grooved separator and spring biasing member 24 has a plurality of grooves which are opposite the grooves in heat dissipator 16. Grooved biasing member 24 has a grooved bearing plate 26 which is fabricated of semi-rigid material—for example a plastic. Bearing plate 26 is spring biased toward heat dissipator 16 by—in the preferred embodiment of this invention—a fibrous spring pad 28.

The fibrous spring pad 28 is preferably fabricated of fiber glass. In an alternative embodiment of this invention (not shown) a plurality of springs may be used.

When a fibrous spring pad 28 is used, it is desirable to eliminate moisture therefrom and keep any flaking or dusting off of the fibrous material from getting into the electronic modules. To eliminate moisture from the spring pad 28 and to eliminate the broadcasting of fibrous material, a moisture proof and dust proof cover 30 is placed around the pad 28.

The spring pad 28 may be relieved as at 32 to cause the spring pad 28 to flex. Further, the relief at 32, or the like, may be adapted to engage a ridge such as ridge 34 in frame 10. The bearing plate 26 and the spring pad 28 are adapted to be inserted—for example—in a channel 36 and 24 in frame 10.

In use, electronic modules of various sizes having flanges adapted to engage heat dissipator 16 and bearing plate 26 are inserted. To insert the modules, the spring pad 28 is slightly compressed. The compression of spring pad 28 by the modules causes spring 28 to force the modules into efficient thermal contact with heat dissipator 16.

A typical heat dissipator 16 is shown in FIG. 2 in which a fluid such—for example—a cooling gas or a liquid flows to remove heat from the electrical modules.

A typical electrical plug unit or connector 18 is shown in FIGS. 1 and 2.

Although the device of this invention has been described in detail in one particular embodiment thereof, it is not intended that the invention should be limited to the embodiment described but should be limited only by the spirit and scope of the appended claims.

I claim:

1. In combination:

means forming a box including;

a pair of parallel opposed grooved members adapted to receive a plurality of shelves in each pair of opposed parallel grooves;

one of said grooved members being a heat dissipator adapted to be in thermal contact with electronic modules and adapted to remove heat therefrom;

the other of said grooved members having a grooved bearing plate adapted to engage the modules and spring means contacting said bearing plate to force the modules into thermal engagement with said heat dissipator.

2. A device as recited in claim 1 and further comprising a fibrous spring pad engaging said bearing plate and adapted to force said bearing plate into engagement with said electronic modules.

3. A device as recited in claim 2 and further comprising a moisture proof and dust proof cover surrounding said fibrous spring pad.

4. A device as recited in claim 3 in which said fibrous spring pad is fabricated of fiber glass.

5. A device as recited in claim 4 in which said moisture proof covering is a flexible plastic material.

6. A device as recited in claim 5 in which said heat dissipator further includes means for channeling a fluid therethrough to remove heat from said dissipator.

7. A device as recited in claim 6 in which said fluid is air.

8. A receptacle for receiving electronic modules comprising:

a heat dissipator having first grooves adapted to receive the sides of electronic modules and adapted to contact the sides of the modules for thermal conduction of heat away from the modules;

and a bearing plate having second grooves parallel to said first grooves and adapted to receive the opposite sides of the modules and spring means contacting said bearing plate adapted to bias the modules into thermal contact with said dissipator comprising a fibrous spring pad adapted resiliently to apply force to said bearing plate.

9. A receptacle as recited in claim 8 in which said fibrous spring pad is fabricated of fiber glass.

10. A receptacle as recited in claim 8 and further comprising a moisture proof and dust proof covering over said fibrous spring pad.

11. A receptacle as recited in claim 8 in which said moisture proof covering is a flexible plastic material.

References Cited by the Examiner

UNITED STATES PATENTS

| | | | |
|---|---|---|---|
| 2,433,847 | 1/48 | Jennings et al. | 117—81 |
| 2,585,109 | 2/52 | Gordon | 117—140 X |
| 2,790,696 | 4/57 | Saunders et al. | 312—351 |
| 2,959,495 | 11/60 | Cubberley et al. | 117—140 X |
| 3,001,102 | 9/61 | Stiefel et al. | 317—101 X |
| 3,026,453 | 3/62 | Marks | 317—101 |
| 3,070,729 | 12/62 | Heidler | 317—100 |
| 3,095,318 | 6/63 | Petzold | 117—140 X |

CHARLES SUKALO, *Primary Examiner.*